United States Patent [19]

Smith

[11] Patent Number: 5,388,878

[45] Date of Patent: Feb. 14, 1995

[54] PORTABLE MANUAL TOOL FOR HAND LIFTING AND CARRYING BULK

[76] Inventor: Peter T. Smith, P.O. Box #323, Peapack, N.J. 07977

[21] Appl. No.: 190,487

[22] Filed: Feb. 2, 1994

[51] Int. Cl.6 ............................................. B65G 7/12
[52] U.S. Cl. ................................... 294/15; 294/55.5
[58] Field of Search ..................... 294/15–17, 294/26, 27.1, 32, 49, 51, 55.5, 56, 60, 62, 63.1, 67.2, 87.1, 87.2, 87.28, 92, 120, 131, 137, 141–143, 159, 167–169; 254/131.5, 132

[56] References Cited

U.S. PATENT DOCUMENTS

| | | | |
|---|---|---|---|
| 567,391 | 9/1896 | Hopper | 254/131.5 |
| 594,644 | 11/1897 | McCorkile | 294/120 X |
| 910,274 | 1/1909 | Duprey | 254/131.5 |
| 943,325 | 12/1909 | Stewart | 254/131.5 |
| 1,194,942 | 8/1916 | Brisack | 294/55.5 |
| 1,237,788 | 8/1917 | Keister | 294/15 |
| 1,267,778 | 5/1918 | Leen | 294/55.5 |
| 1,983,067 | 12/1934 | Butner | 294/26 |
| 2,575,794 | 11/1951 | Chauncey | 294/49 |
| 2,594,791 | 4/1952 | Motl | 294/32 |
| 2,623,775 | 12/1952 | Gamet et al. | 294/67.2 |
| 2,697,627 | 12/1954 | LaFond | 294/32 |
| 2,905,502 | 9/1959 | Brown | 294/27.1 X |
| 3,006,679 | 10/1961 | Gray | 294/62 X |
| 3,078,020 | 2/1963 | Boonstra | 294/15 X |
| 3,223,383 | 12/1965 | Hrabal | 254/131.5 |
| 3,520,570 | 7/1970 | Christopher et al. | 294/27.1 |
| 4,477,972 | 10/1984 | Testa | 254/131.5 X |
| 4,901,801 | 2/1990 | Popivalo | 294/51 X |

FOREIGN PATENT DOCUMENTS

| | | | |
|---|---|---|---|
| 125480 | 7/1949 | Sweden | 294/15 |
| 1360698 | 7/1974 | United Kingdom | 294/15 |

Primary Examiner—Johnny D. Cherry
Attorney, Agent, or Firm—William T. Hough

[57] ABSTRACT

A horizontal forwardly-extending handle is connected to a downwardly arched upright elongated lever rigidly attached to a center point of a horizontal support for a plurality of parallel spaced-apart tines, the horizontal support extending in from the center point in opposite lateral directions for an extended length, having rigidly mounted along the extended length the plurality of parallel spaced-apart tines all extending also forwardly substantially horizontally, the downwardly arched upright lever arching substantially rearwardly, and an intermittently mountable removable tines-ends protective encasing shield structure.

12 Claims, 2 Drawing Sheets

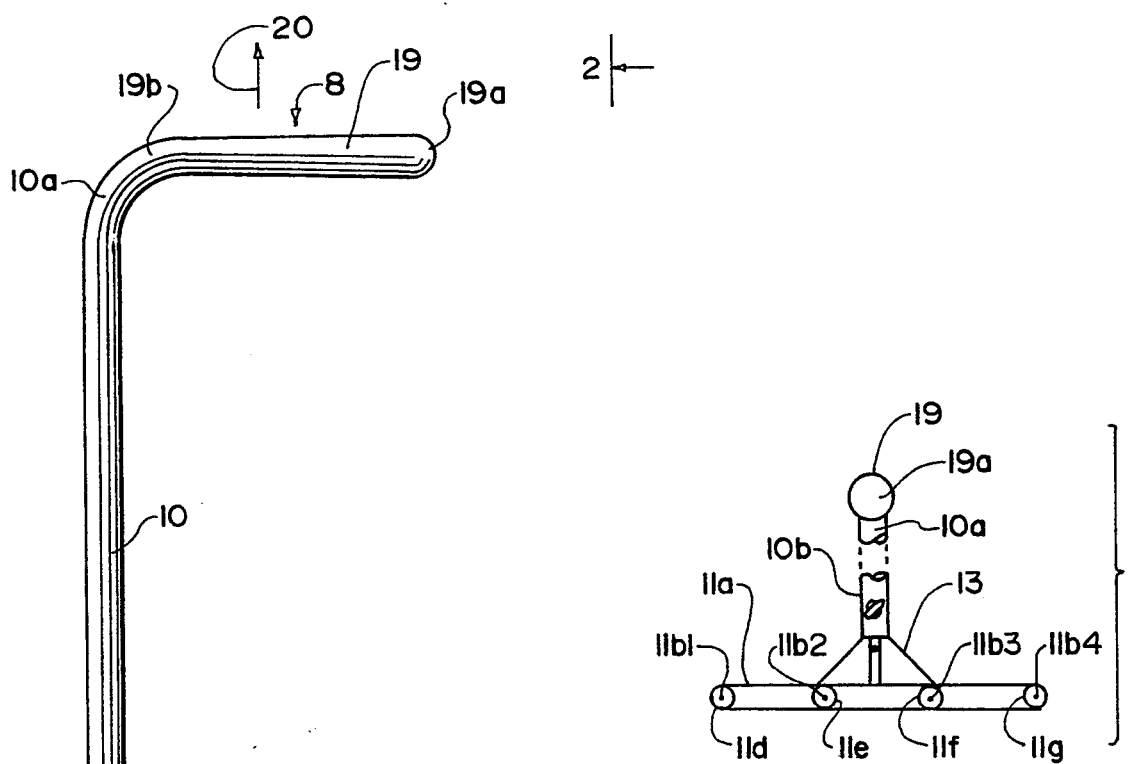
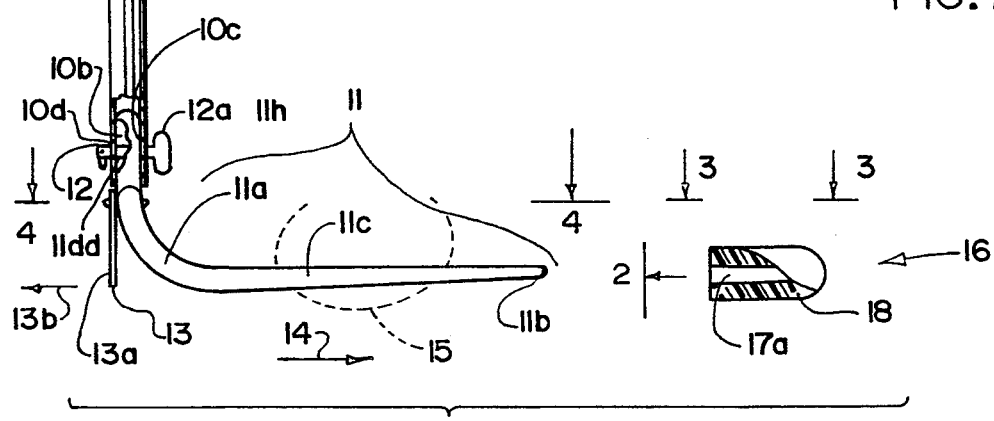
FIG. 1
FIG. 2
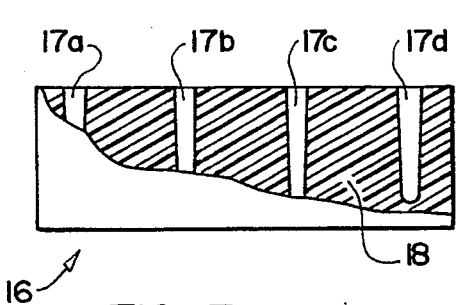
FIG. 3
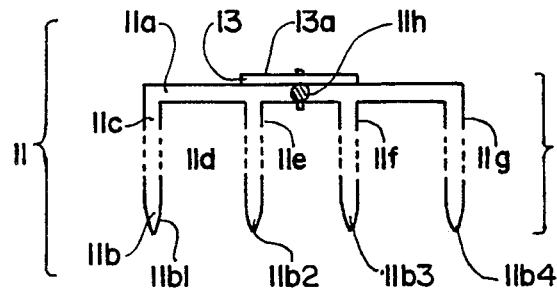
FIG. 4 ns
PORTABLE MANUAL TOOL FOR HAND LIFTING AND CARRYING BULK

THE SPECIFICATION

This invention broadly relates to a novel portable manual hand tool having tines at a lower end thereof for slipping beneath a bulky matter or object and portably manually lifting and manually carrying the same by its upper handle.

PRIOR ART

A patentability search having been performed in the United States Patent & Trademark Office in Class 254, subclasses 131.5 and 132 thereof, and in class 47 in subclass 73 thereof, and in class 294, subclasses 49, 55.5, 120, 121, 122, 123 and 124 thereof, located prior art, none of which was not relevant but that of mere interest is as follows:

a) Popivalo et. al. U.S. Pat. No. 4,901,801 issued Feb. 20, 1990 is to a hand implement having an elongated columnar handle inserted downwardly into a toothed rake-like device having extending in one direction rake teeth extending substantially at an angle laterally and axially from the elongated columnar handle, and there being a blade-mounting structure extending in a direction substantially opposite to that of the rake teeth, with the blade-mounting structure mounting a blade elongated along an axis substantially parallel to the rake teeth, with a forward (bottom) cutting edge also utilizable as a fulcrum for uprooting weed by engagement between the rake teeth.

b) Hopper U.S. Pat. No. 567,391 issued Sep. 8, 1896 is directed to combination digging spade and fork, having a rearwardly positioned fulcrum and roller structure rearward of the downwardly-extending blades or tine thereof.

c) McCorkile U.S. Pat. No. 594,644 issued Nov. 30, 1897 is to a device for use with a crane, connectable by two independent lines connected to different upper and side portions of two linearly downwardly-extending lever structures having rearward support for one of the attachment lines, and having two forwardly spaced-apart linear platform members in parallel alignment, optionally having a bottom downward squared portion shaped to receive a round or square object to prevent it from sliding off of the platform members.

d) Chauncey U.S. Pat. No. 2,575,794 is directed to a two-handled bailed-hay fork having two arcuate tines longly-extended with one handle extending rearwardly from a base of the tines, and with the other handle extending above the tine forward ends.

e) Duprey U.S. Pat. No. 910,274 issued Jan. 19, 1909 illustrates a conventional type pitchfork in which the tines extend substantially parallel with the elongated hand-shaft, inclusive of a shovel-type handle and with an attachment between the fork portion and the elongated shaft in which the attachment provides a foot-pressable member for pressing the tines downwardly by applying foot pressure to the "top" edge of the foot-pressable-member. The foot-pressablemember also is illustrated as used as a fulcrum for lifting tines supporting manure.

f) Stewart U.S. Pat. No. 943,325 issued Dec. 14, 1909 discloses a potato digger pitchfork similar to that of aforestated Duprey patent, except that the typically appearing pitch fork with shovel handle has the foot-pressable member also extending axially parallel with the upwardly extending handle-support shaft and with the foot-pressable member being anchored affixed to an upper portion of the tines-member, with the tines member being pivotally attached to a lower portion of the upwardly-extending handle-support shaft such that downward pivoting movement of the foot-pressable member by foot pressure causes the tines-member and the tines thereof to pivot in order for the tines to lift potatoes from within dirt/soil into which the tines were first diggingly pressed downwardly.

g) Hrabal U.S. Pat. No. 3,223,383 issued Dec. 14, 1965 illustrates a shovel-like tool having a horizontal flat-faced shoveling bottom member with parallel rearwardly-extending fulcrum member, and an handle-support shaft extending at about a 45 degree angle rearwardly in an upward direction opposite from the extended direction of the shoveling bottom member.

h) Testa, Jr. U.S. Pat. No. 4,477,972 issued Oct. 23, 1984 resembles the aforestated Hrabal patent devoid of any rearwardly extending fulcrum, depending upon a sharp-turn as a fulcrum at the bottom of the about 45-degree upwardly extending handle-support shaft and the rearward end of the horizontal shovel-plate.

BACKGROUND TO THE INVENTION

The particular invention as its primary area of use is directed to activities associated with commercial gardening centers at which commercial shrubs, plants or bushes that have been previously dug-up and the bottom soil-carrying roots thereof wrapped typically in burlap bag or the like, are thereafter portably manually lifted and portably carried manually from one location to another at which they are placed in a position for sale or carried at time of sale to a customer's vehicle, or are packed for shipping, or the like. At the time of portably lifting and portably conveying the burlap-bag wrapped roots and attached associated soil, preventing the falling-loose of soil and moisture from the roots as life-preserving matter for the shrubs or plants or bushes, the manual task previously has been one that is awkward to the conveying person. Also normally the worker soils his pants, together with the task of portably manually lifting and carrying the load requiring back-rending bending of the worker's back in order to lift the shrub, bush, plant or the like, and requiring strenuous efforts during the manual portably holding and walking with the conveyed shrub or bushes or plant or the like. During the typical carrying of the shrub, bush or plant or the like, typically with the wrapped roots and dirt as the bottom thereof and with typically the enlarged bushy top or upper body thereof, requires the person to lean sidewardly and/or forwardly during the conveyance, resulting in potential straining of side or back muscles or at least placing substantial strain on the worker's body, back and/or side muscles to the potential detriment of the worker portably manually lifting and conveying the shrub, plant or bush or the like.

OBJECTS OF THE INVENTION

While the present invention includes objects of overcoming and/or obviating the aforestated difficulties, disadvantages and problems of the types described, other objects in arriving at the present invention are as follow.

Another object of the invention is to obtain a portable manual tool for hand lifting and carrying bulk, especially of the above-type described for commercial gardening centers.

Another object is to obtain such a portable manual tool of a portable and light weight size and design.

Another object is to obtain such a portable manual tool adapted to be carried as hanging from a hand beside the person carrying the lifted and conveyed bush, shrub, plant or the like.

Another object is to obtain such a portable manual tool shaped to avoid the falling-off of the bush, shrub, plant or the like during the portable manual lifting and conveying thereof.

Another object is to obtain a design of the aforestated portable manual tool adapted to position lifting force substantially above a center of gravity of weight of a bush, shrub, plant or the like to be or being lifted and conveyed.

Another object is to obtain for the aforestated portable manual tool a shape of an upwardly-extending handle-supporting shaft of a shape adapted to fit around an enlarged mid and/or upper portion(s) of the bush, shrub, plant or the like during the portable manual lifting and conveying thereof in order to improve stable weight distribution on the bottom structure adapted to support the bush, shrub, plant or the like to be portable manually lifted and carried.

Another object is to provide a structure as an integral part of the aforestated portable manual tool adapted to facilitate use of a foot or shoe or boot to enable pushing substantially horizontally a support structure of the portable manual tool into and/or beneath the wrapped bush, shrub, plant or the like prior to the portable manual lifting and carrying thereof.

Another object is to provide a hand-gripable handle shaped to extend substantially horizontally forwardly above a bush, shrub, plant or the like prior to and/or during the lifting and/or conveying thereof.

Another object is to provide as a part of the aforestated tool, alternate substitute support structure(s) of different size(s) and shape(s) and/or length(s) and/or width(s) commensurate with the size and/or weight of the bush, shrub, plant or the like to be lifter and conveyed, for optional alternate attachment and removal from a lower end of the handle-supporting upwardly extending shaft thereof.

Another object is to provide a combination member adapted to protect the worker and/or others from possible potential danger(s) of injury from exposed sharp and/or pointed portions during the lifting and/or carrying of a bush, shrub, plant or the like.

Other objects become apparent from the preceding and following disclosure.

BROAD DESCRIPTION OF THE INVENTION

Broadly the invention may be described as a portable manual bulk lift and carrying handled tool combining the following parts and features:

a) a portable critically substantially uprightly extending elongated lever member having opposite upper and lower end portions;

b) a portable lower fork-like member having transversely-extending critically substantially horizontally tine-support structure(s) and mechanism(s) thereof for supporting tines thereon and the substantially horizontal tine-support structure(s) and mechanism(s) thereof on which the lower end portion is at least one of rigidly mounted or mountable thereon, the horizontal tine-support structure(s) extending critically substantially horizontally in a sideward direction relative to forward and rearward directions;

c) a plurality of spaced-apart tines having at least one thereof mounted or mountable on the horizontal tine-support structure(s) and mechanism(s) thereof with the tines extending in critically a first substantially laterally forward direction relative to the uprightly extending elongated lever member and relative to said sideward direction; and d) a hand-gripable substantially elongated handle having a substantially forward end extending in said forward direction and a substantially rearward end extending in said rearward direction, with the substantially rearward end being rigidly attached to the upper end portion and extending critically substantially horizontally in critically the first substantially laterally forward direction.

Because of the delicate and small margin for variations in the fixing and maintaining of a center of gravity during the carrying of a load of bulk, it is of utmost importance and critical that the elongated lever member be extending substantially uprightly during carrying of the load of bulk, and relative to other above-recited elements/members. Otherwise, the objects of this invention would be substantially defeated and/or made substantially inoperative is so far as the intended function of the present invention.

Likewise, the portable lower fork-like member must have its transversely-extending tine-support structure (s) extending transversely along the above-stated substantially critically substantially horizontal plane in a sideward direction relative to forward and rearward directions. This feature is essential for a plurality of reasons. Firstly, the presence or lack of presence of a level, i.e. horizontal, support for the tines, would result in the lifted and carried bulk of bush, shrub, plant or the like being tilted—which would in turn increase the burden of portably manually lifting and carrying the bulk, and secondly, would increase the likelihood of dumping or bumping the load/bulk accidentally, together with other potential accidents of the types above-discussed.

The basis for the criticality in the plurality of spaced-apart tines mounted or mountable on the horizontal tine-support structure(s) and mechanism(s) thereof extending in critically a first substantially laterally forward direction relative to the uprightly extending elongated lever member, is again that is fixing and maintaining a particular critical center of gravity required during the carrying of the load of bulk. Absence of the tines extending forwardly for at-least a major portion of their length and for at-least a major number of the tines, is substantially the same as and consistent with the above-stated necessity that the handle also extend forwardly. It must be noted, however, while to do so would not be as workable nor desirable, it would be possible to carry the tool facing in a reverse direction, and still be within the scope and objects of the invention.

Accordingly also for the same reasons, the hand-gripable substantially elongated handle extending critically substantially horizontally in critically the first substantially laterally forward direction is based on the same above-stated reasons regarding the forwardly extending direction of the tines.

As a first preferred embodiment as an improvement on the aforestated broad invention, there is included critically a substantially planar member extending substantially uprightly. The substantially planar member has a planar surface substantially facing in critically the second substantially lateral direction with the planar member being mounted on the lower end portion such that the planar surface is utilizable as a kick or foot push plate. Thereby the substantially horizontally extending tines may be urged axially forwardly while a hand grasps and holds the hand-gripable substantially elongated handle. Relative to the cumbersome nature of dug-up shrubs, bushes, etc., particularly where their roots and associated dirt or soil are consciously held in-tact—i.e. prevented from falling away by having been normally already typically in burlap bag, and considering that it is of utmost importance that the bushy upper portions not be broken nor disfigured during the lifting without the aid of handles on bushes, shubs, etc., it therefore is critical, as above stated, that in this preferred embodiment for the benefits thereof that it have the critical planar member and that that planar member be facing in the rearward lateral direction.

In a second preferred embodiment as an improvement on the first preferred embodiment, the substantially uprightly extending elongated lever member includes an intermediate portion extending between the upper and lower portions and the intermediate portion includes critically a substantially laterally extending arcuate portion forming an arc with a substantially central portion thereof extending in a direction away from and substantially opposite to the first and second substantially lateral directions. For the novel benefits of this particular second preferred embodiment, preventing the tipping or potential tipping and/or less than upright resting of the bush or shrub on the tines during conveyance thereof, the substantially laterally extending arcuate portion forming its arc is critically essential for this preferred embodiment.

In a third preferred embodiment as an improvement on the second preferred embodiment, the tine-support structure(s) and mechanism(s) thereof is critically substantially upright and is critically rigidly attachable to and intermittently detachable from the lower end portion, in order to assure sturdy and stable non-shifting of the overall tine-support structure(s) and tines extending rigidly therefrom. Otherwise invites a less than perfect and/or maintainable fixed and desired stable point of downward center of gravity directly beneath the horizontally and forwardly extending handle during the carrying/conveying of the bulk.

In a fourth preferred embodiment as an improvement on the third preferred embodiment, there is included at least one additional alternate one of the portable lower fork-like member interchangeably with the portable lower fork-like member. The at-least one additional alternate one has/have a different plurality of spaced-apart tines having lengths different from the portable lower fork-like member. Also in this preferred embodiment, there is included fork-like member attaching structure(s) and mechanism(s) thereof for intermittently alternately locking on and unlocking from at least one of the portable lower fork-like member and the additional alternate one onto and from the lower end portion. This embodiment's preferred feature novelly provides for commercial bushes and/or other plants and the like, flexibility afforded to adjust for varying the sizes, shapes and weights of the many different types handled, in the lifting and carrying thereof, and accordingly this detachable and substitutable feature is critical to this novel and important benefit.

In a fifth preferred embodiment as an improvement on the fourth preferred embodiment, the substantially horizontal tine-support structure(s) and mechanism(s) thereof include(s) a substantially horizontally-extending elongated structure extending at critically a substantially parallel to flat surfaced ground relative to the uprightly extending elongated lever member, and extending sidewardly at an angle (normally about 90 degrees) relative to forward and/or rearward directions and relative to the forwardly-extending directions of at-least most of the plurality of spaced-apart tines. Each of the plurality of spaced-apart tines is/are rigidly mounted on and extending substantially horizontally from the horizontally-extending elongated structure. This structure critically provides for or makes possible optimal desired large-spacing of the tines from one-another, potentially preventing tipping or falling-off of the bulk matter from the tines and/or better assuring a stable downward center of gravity relative to the hand thereabove.

In a sixth preferred embodiment as an improvement on the fifth preferred embodiment, at-least one of a) the fork-like member attaching structure(s) and mechanism(s) thereof, b) the substantially upright structure of the tine-support structure(s) and mechanism(s) thereof and c) the lower end portion includes critical engaging and aligning structure(s) and mechanism(s) thereof for always maintaining the hand gripable substantially elongated handle extending in the common direction when the portable lower fork-like member attaching structure(s) and mechanism(s) thereof locks on at least one of the portable lower fork-like member and the additional alternate one onto the lower end portion. This particular feature is critical for maximum benefits in maintaining the downward-extending center of gravity relative to the forwardly extending handle. This feature, associated with interchangeable tines, assures that the mating structures are properly aligned.

In a seventh preferred embodiment as an improvement on the sixth preferred embodiment, the plurality of spaced-apart tines include(s) at-least three tines inclusive of two outer tines and at-least one intermediate tine. For the more preferred benefits of this embodiment, the two outer tines critically are of length dimension(s) lesser than the at-least one intermediate tine(s), critically making possible the longer intermediate tine(s) to fully extend beneath the major portion of the bulk, with the outer tines providing mere side support in potential prevention of wobbling or falling sidewardly of the bulk.

In an eighth preferred embodiment as an improvement on the seventh preferred embodiment, the plurality of spaced-apart tines include at-least three tines. The at-least three tines include two outer tines and at-least one intermediate tine. Also at-least the intermediate fine(s) has/have terminal end portions angled upwardly from a horizontal an amount of from about one degree to about 25 degrees. For optimally preventing the bulk from slipping off-of the forward ends of the main weight-carrying intermediate tines, the aforestated angles of the end-portions thereof are critical to the obtaining of this preferred additional benefit.

In a ninth preferred embodiment as an improvement on the eighth preferred embodiment, the amount of upward angle ranges from about one degree to about ten degrees. As stated for the benefits of the eighth preferred embodiment, the aforestated lesser critical range in degrees obtains most optimal results.

In a tenth preferred embodiment as an improvement on the ninth preferred embodiment, there is additionally included in combination with other aforestated elements, a removable tine-end protective encasing shield structure(s) and mechanism(s) thereof for preventing tine ends of the plurality of tines from becoming accidentally engaged into or onto a person accidentally. This combination feature is directed to diminish any potential safety hazard associated with projecting tines during the lifting and carrying and/or storing of the overall tool. Because during the carrying of bulk utilizing the tool of this invention, the tines are forwardly directed, as a valuable accessory critically enhancing safety in its use, the aforestated tine-end protective casing is easily mountable thereon. Also it is of equal value for use during storage of the tool and/or of alternate tines therefor.

In an eleventh preferred embodiment, as an improvement on the fourth preferred embodiment, the plurality of spaced-apart tines extend critically substantially in parallel to one-another. While it is possible to engage the tines under the bulk of wrapped dirt and roots normally encased within the burlap bag normally wrapped around and bound thereon, much improved results are critically obtainable by the tines being parallel so as to not bind during the pressing forward thereof prior to the lifing and conveying.

The invention may be better understood by making reference to the drawings of the following Figures.

THE FIGURES

FIG. 1 symbolically and diagrammatically illustrates one embodiment of the above described invention, shown in side view thereof with partial cut-away, including also the tine removable protective cover also shown in partial end cutaway.

FIG. 2 symbolically and diagrammatically illustrates a view of the FIG. 1 embodiment as taken along line 2—2 of FIG. 1, more particularly showing a front-end view of the tines and tine support structure.

FIG. 3 symbolically and diagrammatically illustrates a view of FIG. 1 as taken along line 3—3 of FIG. 1, more particularly of the fine removable protective cover.

FIG. 4 symbolically and diagrammatically illustrates a view of FIG. 1 as taken along line 4—4 of FIG. 1, more .particularly showing a top view of the tines and its mounted foot kicker plate.

FIG. 5 symbolically and diagrammatically illustrates another embodiment of the above described invention, shown in side view thereof with partial cut-away.

FIG. 6 symbolically and diagrammatically illustrates a view of the FIG. 5 embodiment as taken along line 6—6 of FIG. 5, more particularly showing a front-end view of the tines and tine support structure.

FIG. 7 symbolically and diagrammatically illustrates a view of FIG. 5 as taken along line 7—7 of FIG. 5, more particularly showing a top view of the tines and its mounted foot kicker plate.

DETAILED DESCRIPTION OF THE INVENTION

Figure 5:
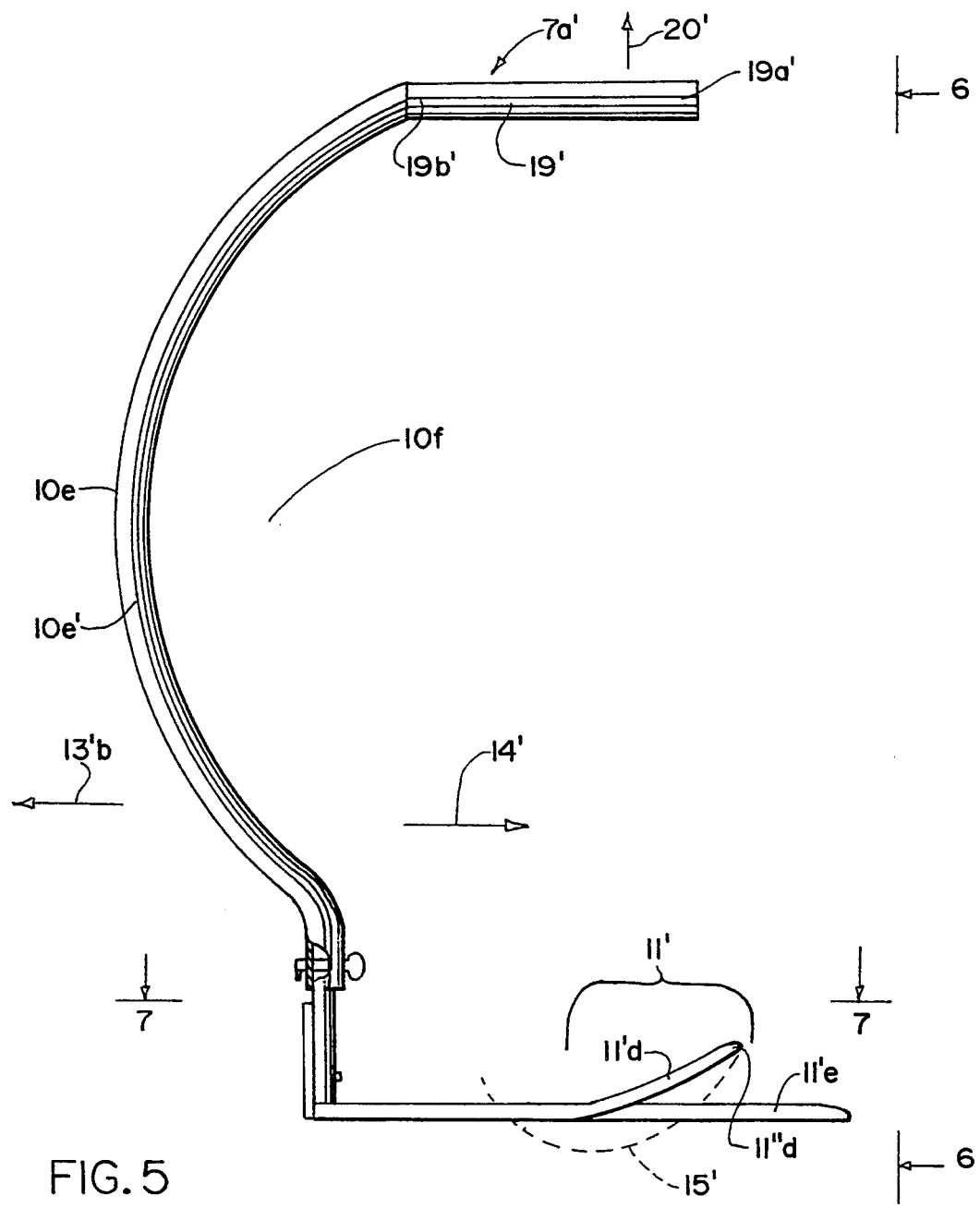
Figure 6:
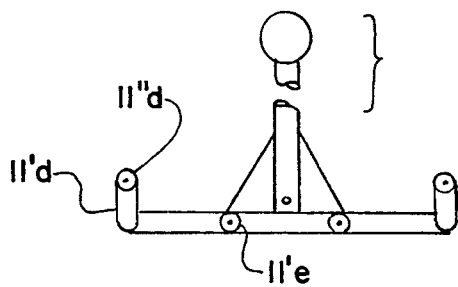
Figure 7:
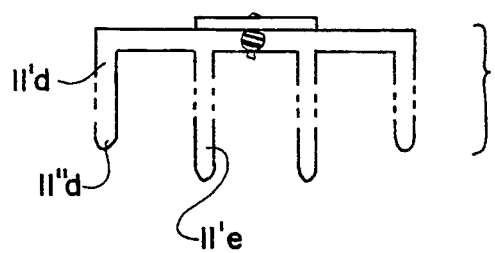

With reference to the foregoing Figures, FIGS. 1 through 4 relates to one embodiment 8 of the portable manual bulk lift and carrying handled tool embodying one or more of the preferred features, while FIGS. 5 through 7 illustrate another embodiment 9 of the portable manual bulk lift and carrying handled tool embodying others of preferred features.

FIG. 1's embodiment 8 has a portable substantially uprightly extending elongated lever member 10—in this instance substantially the entire length thereof being vertical in its normal orientation when sitting uprightly on its portable lower fork-like member 11. The lever 10 has its upper end portion 10a and its lower end portion 10b. Therebelow is the above-noted portable lower fork-like member having the transversely-extending substantially horizontal tine-support structure 11a and mechanism thereof such as the upright lever-connecting male shaft 11h mounted within the lever's (10) lower end portion's (10b) female-receptacle 10c formed by rigidly-attached structure of the lever lower end portion 10b; also, the above-noted horizontal tine-support structure 11a anchors and rigidly supports the plurality of tines 11c, locked into its attached position and state by key shaft 12b having key handle 12a, with the key 12b extending through opening 10d of the lower end portion 10b and through the through-space channel 11dd of aforestated shaft 11h, thereby rigidly connecting the horizontal tine-support structure 11a and the uprightly extending elongated lever member 10. Each of FIGS. 3 and 4 illustrate views of the sidewardly extending orientation of the horizontal tine-support structure 11a, relative to the top and bottom orientation of the uprightly extending elongated lever member 10 and relative to the forwardly directed horizontal handle 19. Also as another element of the portable manual bulk lift and carrying handled tool combination, there is the foregoing plurality of tines 11, inclusive of spaced-apart separate tines such as the illustrated tines 11d through 11g, having their forwardly-directed terminal ends 11b1, 11b2, 11b3 and 11b4. The remaining primary element of the portable manual bulk lift and carrying handle tool combination is the aforestated forwardly directed handle, i.e. a hand-gripable substantially elongated handle 19, having its forward distal end 19a and its rearward mounting end 19b mounted rigidly to the upper end portion 10a, here as a continuation of the uprightly extending elongated lever member 10.

The upright lever-connecting male shaft is a lower terminal part of the above-noted lower end portion, and in an embodiment not illustrated has solely an integral (unitary/one-piece) structure including both the uprightly extending elongated lever member 10 and the transversely-extending substantially horizontal tine-support structure 11a. Mounted normally on a rearward face of the upright lever-connecting male shaft 11h is the planar member 13 that extends substantially uprightly from the transversely-extending substantially horizontal tine-support structure 11a and has a planar (i.e. flat) surface 13a facing in the second lateral direction 13b, i.e. rearwardly. This rearwardly facing planar member is referred to above as a kick plate (i.e. push plate), denoting its functional use, to be kicked or pushed forwardly with a worn shoe or boot of the person, thereby who pushes the tines 11c forwardly in forward direction 14 into and/or beneath normally wrapped dirt and roots of previously a dug-up bush, shrub, tree, or the like shown in phantom designated indicia 15. This particular illustrated embodiment 8 thus has the substantially upright structure extending from the horizontal support structure 11a, both rigidly attached/attachable and concurrently intermittently detachable from the remaining upper portion of the lower end portion 10b.

While the FIG. 5 illustrates an alternate other embodiment, the transversely-extending substantially horizontal tine-support structure 11′a is interchangeable with that of FIG. 1, the transversely-extending substantially horizontal tine-support structure 11a, as typically alternately utilizable tines 11 and 11′ thereof.

The FIG. 5 other embodiment 9 differs from the embodiment 8 of FIG. 1, solely in the inclusion as a part of the embodiment 9, of the intermediate portion 10e as a laterally extending arcuate portion that forms the typically illustrated arcuate portion with its intermediate portion 10e′ between upper and lower end portions (above-noted) extending in the rearward direction 13′b (opposite from the forward direction 14′), the direction 14′ being the aforestated first and second substantially lateral directions. As a result of the rearwardly-directed arc, there is formed a forward concave-shaped space 10f providing space for an enlarged upper portion of a bush, shrub, tree, or the like when the bottom roots 15′ thereof are carried on the tines 11′, such as outer-tine 11′d of shorter length having a terminal upwardly-turned end 11″d, and an intermediate linear longer tine 11′e.

FIG. 2 illustrates a forward-to-rearward view of the FIG. 1 embodiment as taken along line 2—2 of FIG. 1, showing also the parallel and spaced-apart relationships of the tines 11d, 11e, 11f, 11g and their terminal ends 11b1, 11b2, 11b3 and 11b4.

FIG. 3 illustrates a top view with partial cut-away of the FIG. 1 mountable tines-cover, i.e. the removable tine-end protective encasing shield structure 16 having typically resilient plastic composition 18 forming tine-receiving open-ended channels 17a, 17b, 17c, and 17d.

For the FIG. 5 embodiment, the FIG. 6 view and parts/elements illustrated correspond substantially to the FIG. 2 view. Likewise, the FIG. 7 corresponds to the view of FIG. 4.

Accordingly, for both of the illustrated embodiments 8 and 9, the portable manual bulk lift and carrying handled tools thereof are self supporting in the illustrated erect positions as a result of the center of gravity thereof and the horizontally extending tines. Likewise, after pushing with the foot or boot or shoe of the worker against the kick plate sufficiently to urge the tines into and/or beneath the normally burlap bag or other cover tied or otherwise secured around roots and dirt/soil thereof of a shrub, bush, tree, other plant or the like, the handle is lifted in an upward direction 20 or 20′, and while lifted and hung/suspended by the worker's hand holding the handle 19 or 19′, is carried by the worker's side (and leg) in the forward direction 14 or 14′, to an appropriate location, at which time the tines 11 or 11′ would be withdrawn after setting-down the roots and dirt and the cover thereof (if a cover were utilized).

Considerable variations may be made within the scope of the invention in so far as dimensions are concerned, ranging from a small light-weight and short tool to a heavy-duty version for large plants and shrubs, trees, other plants, and the like. However, typically the vertical height of the embodiments such as illustrated in FIGS. 1 and 5 range from about 18 to 36 inches, more preferably from about 15 to 25 inches, typically being about 18 inches in height. The handle length ranges from about 5 to about 18 inches, more preferably from about 7 to about 14 inches, typically about 10 inches. The handle such as typically shown is round in cross-section, i.e. substantially cylindrically shaped, having a diameter or thickness ranging from about 0.5 inch to about 2 inches, more preferably from about 0.75 inch to about 1.25 inch, typically abut 1.125 inch. The length range typically from outer tines ranges from about 6 to about 16 inches, more preferably from about 8 to 14 inches, typically about 10 when with upwardly turned end portions thereof or about 12 when linear. When there are upwardly-turned end portions to the tines, the height of the terminal ends of the tines range from the ground from about ½ inch to about 5 inches, preferably from about 1 to about 4 inches, typically about 2 or 3 inches. The kick plate above-noted ranges in its height dimension from about 2 to 6 inches, more preferably from about 3 to 5 inches, typically about 3 or 4 inches, and has a plate thickness ranging from about ⅛ inch up to about 1 inch, more preferably from about ⅜ inch to about ⅔ inch, typically about ½ inch. The widest part of the kick plate ranges from about 2.5 inches up to about 8 inches, more preferably from about 3 inches up to about 6 inches, typically about 4 or 5 inches. The aforestated typically round elongated upright lever 10 has a diameter or thickness ranging from about ¼ inch to about 3 inches, more preferably from about 0.5 to about 1 inch, typically about ¾ inch. The transversely-extending substantially horizontal tine-support structure extends laterally (sidewardly) in its entire length from about 5 to 15 inches, more preferably from about 7 to 12 inches, typically about 9 inches. The individual tines at the rearward end thereof range in diameter or thickness from about ⅛ inch up to about ½ inch, more preferably from about ¼ inch up to about ⅓ inch, typically about 0.3 inch. The terminal ends of the tines range in diameter or thickness from a sharp point up to about ½ inch, more preferably from about ⅛ to about ⅓ inch, typically about ¼ inch.

While one or more parts and/or elements above-described may be of plastic and/or wood and/or of fiberglass, more often and preferably they are of durable rust-proof hard metal, apart from the handle typically having a soft or comfortable rubber, plastic or padded make-up mounted on a rigid and strong member typically also metal or wood.

It should be noted that an obvious equivalent would be for the kick plate to be substituted in its entirety or in-part for the bottom end portion of the upright lever 10 or 10′, and/or for an upper portion of the transversely-extending substantially horizontal tine-support structure 11 or 11′.

It is within the scope and skill of an ordinary aritisan in this field of endeavor, to make such variation(s), modification(s) and/or substitution of equivalents as would be obvious.

I claim:

1. A portable manual bulk lift and carrying handled tool comprising in combination:
   a) A portable substantially uprightly extending elongated lever member having opposite upper and lower end portions;
   b) a portable lower fork-like member having transversely-extending substantially horizontal tine-support means for supporting tines thereon and the substantially horizontal tine-support means being at least one of mounted and mountable on said lower end portion, the transversely-extending substantially horizontal support means extending substantially horizontally in a sideward direction relative to forward and rearward directions;

c) a plurality of spaced-apart tines having at least one thereof mounted and mountable on said horizontal tine-support means with the tines extending in a first substantially laterally forward direction relative to said portable substantially uprightly extending elongated lever member and relative to said sideward direction, said spaced-apart tines each having tine distal ends;

d) a hand-gripable substantially elongated handle having a substantially forward end extending in said forward direction and a substantially rearward end extending in said rearward direction, with the substantially rearward end being rigidly attached to said upper end portion and extending substantially horizontally in the first substantially laterally forward direction;

e) a substantially planar member extending substantially uprightly and having a planar surface substantially facing in a second substantially laterally forward direction with the planar member being mounted on said lower end portion such that said planar surface is utilizable as a plate positioned and adapted to be kicked or pushed by which the substantially horizontally extending tines may be urged axially forwardly while a hand grasps and holds said hand-gripable substantially elongated handle, said portable substantially uprightly extending elongated lever member including an intermediate portion extending between said opposite upper and lower end portions, said intermediate portion including a substantially laterally extending arcuate portion forming an arc with a substantially central portion thereof extending in a direction away from and substantially opposite to said first and second substantially laterally forward directions.

2. The portable manual bulk lift and carrying handled tool of claim 1, in which said plurality of spaced-apart tines includes at-least three tines inclusive of two outer tines and at-least one intermediate tine, and in which at-least said intermediate tines have terminal end portions angled upwardly from a horizontal an amount of from about one degree to about 25 degrees.

3. The portable manual bulk lift and carrying handled tool of claim 2, in which said amount is from about one degree to about ten degrees.

4. The portable manual bulk lift and carrying handled tool of claim 1, including in combination therewith, a removable tine-end protective encasing shield means for preventing tine ends of said plurality of tines from becoming accidentally engaged into or onto a person accidentally.

5. A portable manual bulk lift and carrying handled tool comprising in combination:

a) A portable substantially uprightly extending elongated lever member having opposite upper and lower end portions;

b) a portable lower fork-like member having transversely-extending substantially horizontal tine-support means for supporting tines thereon and the substantially horizontal tine-support means being at least one of mounted and mountable on said lower end portion, the transversely-extending substantially horizontal support means extending substantially horizontally in a sideward direction relative to forward and rearward directions;

c) a plurality of spaced-apart tines having at least one thereof mounted and mountable on said horizontal tine-support means with the tines extending in a first substantially laterally forward direction relative to said portable substantially uprightly extending elongated lever member and relative to said sideward direction, said spaced-apart tines each having tine distal ends;

d) a hand-gripable substantially elongated handle having a substantially forward end extending in said forward direction and a substantially rearward end extending in said rearward direction, with the substantially rearward end being rigidly attached to said upper end portion and extending substantially horizontally in the first substantially laterally forward direction;

e) a substantially planar member extending substantially uprightly and having a planar surface substantially facing in a second substantially laterally forward direction with the planar member being mounted on said lower end portion such that said planar surface is utilizable as a plate positioned and adapted to be kicked or pushed by which the substantially horizontally extending tines may be urged axially forwardly while a hand grasps and holds said hand-gripable substantially elongated handle, said portable substantially uprightly extending elongated lever member including an intermediate portion extending between said opposite upper and lower end portions, said intermediate portion including a substantially laterally extending arcuate portion forming an arc with a substantially central portion thereof extending in a direction away from and substantially opposite to said first and second substantially laterally forward directions, said substantially planar member being rigidly attachable to and intermittently detachable from said lower end portion.

6. A portable manual bulk lift and carrying handled tool comprising in combination:

a) A portable substantially uprightly extending elongated lever member having opposite upper and lower end portions;

b) a portable lower fork-like member having transversely-extending substantially horizontal tine-support means for supporting tines thereon and the substantially horizontal tine-support means being at least one of mounted and mountable on said lower end portion, the transversely-extending substantially horizontal support means extending substantially horizontally in a sideward direction relative to forward and rearward directions;

c) a plurality of spaced-apart tines having at least one thereof mounted and mountable on said horizontal tine-support means with the tines extending in a first substantially laterally forward direction relative to said portable substantially uprightly extending elongated lever member and relative to said sideward direction, said spaced-apart tines each having tine distal ends;

d) a hand-gripable substantially elongated handle having a substantially forward end extending in said forward direction and a substantially rearward end extending in said rearward direction, with the substantially rearward end being rigidly attached to said upper end portion and extending substantially horizontally in the first substantially laterally forward direction;

e) a substantially planar member extending substantially uprightly and having a planar surface substantially facing in a second substantially laterally forward direction with the planar member being mounted on said lower end portion such that said planar surface is utilizable as a plate positioned and adapted to be kicked or pushed by which the substantially horizontally extending tines may be urged axially forwardly while a hand grasps and holds and hand-gripable substantially elongated handle, said portable substantially uprightly extending elongated lever member including an intermediate portion extending between said opposite upper and lower end portions, said intermediate portion including a substantially laterally extending arcuate portion forming an arc with a substantially central portion thereof extending in a direction away from and substantially opposite to said first and second substantially laterally forward directions, said substantially planar member being rigidly attachable to and intermittently detachable from said lower end portion; and f) at least one additional alternate one of said portable lower fork-like member interchangeable with said portable lower fork-like member, said at-least one additional alternate one having a different plurality of spaced-apart tines having lengths different from said portable lower fork-line member, and including fork-like member attaching means for intermittently alternately locking on and unlocking from at least one of said portable lower fork-like member and said additional alternate one onto and from said lower end portion.

7. The portable manual bulk lift and carrying handled tool of claim 6, in which said substantially horizontal tine-support means includes a substantially horizontally-extending elongated structure extending at an angle to said plurality of spaced-apart tines, each of said plurality of spaced-apart tines being rigidly mounted on and extending substantially horizontally from said horizontally-extending elongated structure.

8. The portable manual bulk lift and carrying handled tool of claim 7, in which at least one of a) said fork-like member attaching means, b) said substantially planar member, and c) said lower end portion includes engaging and aligning means for always maintaining said hand gripable substantially elongated handle extending in said forward direction when said fork-like member attaching means locks on at least one of said portable lower fork-like member and said additional alternate one onto said lower end portion.

9. The portable manual bulk lift and carrying handled tool of claim 8, in which said plurality of spaced-apart tines includes at-least three tines inclusive of two outer tines and at-least one intermediate tine, said two outer tines being of a length dimension lesser than said at-least one intermediate tine.

10. The portable manual bulk lift and carrying handled tool of claim 9, in which said plurality of spaced-apart tines includes at-least three tines inclusive of two outer tines and at-least one intermediate tine, and in which at-least said one of said intermediate tines has a terminal end portion angled upwardly from a horizontal an amount of from about one degree to about 25 degrees.

11. The portable manual bulk lift and carrying handled tool of claim 10, in which said amount is from about one degree to about ten degrees.

12. The portable manual bulk lift and carrying handled tool of claim 11, including in combination therewith, a removable tine-end protective encasing shield means for preventing said tine distal ends from becoming accidentally engaged into or onto a person accidentally.

* * * * *